3,036,052
PROCESS FOR IMPROVING THE DYESTUFF-AFFINITY OF COPOLYMERS OF ACRYLO-NITRILE
Gerhard Bier and Albert Gustav Martin Gumboldt, Frankfurt am Main, Adolf Hartmann, Gessertshausen, near Augsburg, and Wilhelm Happe, Schwalbach (Taunus), Germany, assignors to Farbwerke Hoechst Aktiengesellschaft vormals Meister Lucius & Brüning, Frankfurt am Main, Germany, a corporation of Germany
No Drawing. Filed May 8, 1956, Ser. No. 583,374
Claims priority, application Germany May 11, 1955
15 Claims. (Cl. 260—85.5)

This invention relates to a process for the after-treatment of copolymers of acrylonitrile.

It is known that copolymers of acrylonitrile which contain an excess of the acrylonitrile component enable the production of textile fibers having excellent properties. It is also known that the poor dyestuff affinity of pure polyacrylonitrile for the various classes of dyestuffs can be improved by preparing copolymers of acrylonitrile with monomers which contain functional groups having a chemical affinity for dyestuffs. Exemplary of such monomers with an affinity for acid dyestuffs are unsaturated compounds which contain basic, preferably tertiary or quaternary nitrogen in the molecule, and monomers with exchangeable halogen which allow of incorporating into the polymer basic nitrogen after a subsequent treatment with ammonia or amines. It is also known that compounds containing acid groups, such as acrylic or styrene sulfonic acid, can be incorporated into polymers of acrylonitrile which are thereby given an affinity for basic dyestuffs. The color effects so produced are more or less restricted to certain classes of dyestuffs and it is impossible to obtain tints outside the shades produced with the usual dyestuffs. Thus, for example, it is impossible to use the metal complex dyestuffs which owing to their fastness properties are of special interest.

Now we have found that macromolecular copolymers of acrylonitrile with esters of the vinyl phosphonic acid can be after-treated by subjecting them to amination and/or to hydrolysis.

The esters of vinyl phosphonic acid used for the preparation of copolymers with acrylonitrile may have the following general formula:

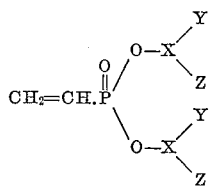

and

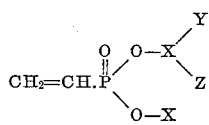

wherein X represents an aliphatic radical containing 1 to 4 carbon atoms, Y represents a halogen atom and Z represents a halogen atom or a hydrogen atom. In the above vinyl phosphonates the hydrocarbon radical X is to contain at least once the substituents Y and Z. Such esters of vinyl phosphonic acids are known to the art, and are commercially available. The hydrolysis of these macromolecules according to this invention may also consist in a partial saponification. The amination can be performed using primary, secondary or tertiary amines with formation of amino-alkyl esters or quaternary compounds of the copolymers.

The amination according ot this invention is sometimes accompanied by a partial hydrolysis. Naturally, the process of this invention can also be performed in such a way that the copolymers undergo either amination or hydrolysis. The parital hydrolysis according to this invention enables also the preparation of polymers which have the character of acid esters. In this manner there can be obtained in the form of a powder or a shaped body the above copolymers of amphoteric character which can be dyed with advantage using both acid and basic dyestuffs.

Hence, the process of this invention constitutes a surprising and valuable advance in the art.

The monomers containing phosphorus referred to above can be prepared by dehydrochlorination of beta-chlorethyl-phosphonic acid-bis-(beta-chlorethyl)-esters at a raised temperature using salts of organic acids. The monomers so produced are capable of being polymerized and copolymerized, for example, with the use of radical-forming substances.

Although the reactions according to this invention can be performed just as well with the monomer, i.e. the vinyl phosphonic component of the above copolymer, said component being polymerized subsequently with an excess of acrylonitrile, it is preferable to use the finished copolymers for performing the amination and saponification.

The finished copolymers themselves can be aminated in a suitable solvent, preferably dimethylformamide or cyclic tetramethylene-sulfone, and be saponified in aqueous solution after the shaping process to foils or threads, or both reactions, that is amination and saponification, can be effected in the aqueous phase. It is also possible to subject the powdery copolymer to a partial saponification and to perform the amination in an organic medium or, after the shaping process, in an aqueous phase. These reactions may be conducted at room temperature or, preferably, at elevated temperatures to shorten the time of reaction. In this case, it is often expedient or necessary to operate under elevated pressure. In the case of a reaction carried out under pressure, it is, however, advisable, not to exceed a temperature of 120° C., in order not to damage the polymers with respect to the solidity of the products prepared from these polymers.

As amines there may be used, for example, methyl amine, dimethyl amine, trimethyl amine and other primary, secondary, tertiary, aliphatic, aromatic and mixed aliphatic-aromatic amines, heterocyclic compounds, such as morpholine, pyridine, piperidine, pyrrolidine, piperazine as well as amines containing hydroxylic groups, such as ethanol amine, diethanol amine, triethanol amine, dimethylamino-ethanol and polyamines, such as ethylene diamine and hexamethylene diamine.

Especially good effects can be obtained using compounds which contain an ethylene imine ring, such as ethylene-imino-propionitrile. It is also possible to use substances which owing to their tautomeric nature react like bases, such as thiourea, methyl-thiourea, ethylene-thiourea, butylethylene-thiourea, benzimidazolthiol as well as 2-mercaptobenzthiazol. To improve the resulting products as regards solidity to light and heat, it is often desirable to saturate the basic groups with anions. To this end there can be used various acids, such as sulfuric acid, phosphoric acid, hypophosphorous acid and especially hydrofluoboric acid, whose 2 to 5% aqueous solutions are preferably used for the after-treatment of the copolymers at a raised temperature. The partial saponification can be effected with the use of solutions of alkali carbonates or alkali hydroxides or solutions of alkaline earth metal hydroxides, or with the use of dilute acids.

According to this invention there can also be used polymers which, in addition to the acrylonitrile and the vinyl phosphonic acid, contain in the molecule groups which impart to the macromolecule an additional affinity for various classes of dyestuffs. Such groups can be incorporated into the macromolecule by a known polymerization with monomeric compounds, such as acrylic acid- and methacrylic acid-beta-dimethyl-amino-ethyl-ester, -beta-diethyl-amino-ethyl-ester, -beta-pyrrolidine-ethyl-ester, -beta-morpholino-ethyl-ester, acrylic acid- and methacrylic acid-beta-dimethylamino-ethyl-amide, acrylic acid- and methacrylic acid -gamma-dimethyl-amino-propyl-amide, vinyl pyridine and the homologue thereof, N-vinyl-imidazole, N-vinyl-benzimidazole and N-vinyl-oxazole. As suitable compounds of acid nature there can be used acrylic acid, methacrylic acid, fumaric acid, maleic acid, crotonic acid and vinyl-sulfonic acid. To render the polymers more hydrophilic there can also be used as cocomponents polymerizable compounds which in themselves contain already hydrophilic groups or are capable of forming hydrophilic groups. As such compounds there may be mentioned, more especially, vinyl acetate, vinyl formate, acrylamide or methacryl amide, acrylic acid-beta-oxyethyl-amide, allyl alcohol or methallyl alcohol.

By an appropriate choice of the amount and the concentration of the amine and the reagent to be saponified, it is possible to attain the desired degree of activation of the polymer for dyeing purposes. To this end it has proved to be advantageous to use the amines at least in equimolecular amounts calculated upon the exchangeable halogen and, preferably, a pronounced excess of the amine. If only a saponification is performed, it is advantageous to use the known reagent which is to be saponified in an amount such that the reaction is carried out at a pH of 1 to 6, preferably 2 to 4. The degree of dyestuff affinity of the finished product can also be regulated by the amount of the hetero-component containing phosphorus which is incorporated into the chain of the polymer. Generally, the hetero-component is present in a proportion of 20%, calculated upon the acrylonitrile and, preferably, in a proportion between 2 and 18%.

The following examples serve to illustrate the invention, but they are not intended to limit it thereto, the parts being by weight unless otherwise stated.

Example 1

A 23% solution of a copolymer of 97 parts of acrylonitrile and 3 parts of vinyl-bis-(beta-chlorethyl)-phosphonate in dimethyl formamide is spun in a countercurrent of moderately heated air and the thread obtained is stretched at 155–160° C. in a ratio of 1:5. The thread so produced is then treated for 90 minutes at 98° C. with a 7.5% aqueous solution of pyrrolidine, washed, acidified for 15 minutes at 98° C. with a 2% sulfuric acid and washed until neutral. The thread is then dyed for 90 minutes with Alizarin Sky Blue FFB with addition of 3% formic acid (calculated upon the fiber); dyestuff affinity: 4%. A deep blue tint is produced which is fast to washing and boiling.

Example 2

A thread prepared as described in Example 1 is treated for 60 minutes at 105° C. and with application of pressure with a 10% aqueous solution of ethylene thiourea and then washed. The fiber is practically colorless and when heated for 20 minutes at 150° C. assumes no noteworthy discoloration. The fiber can be dyed with acid dyestuffs, such as Orange II or Alizarin Sky Blue FFB; the tints produced have a very good fastness to washing. The fiber has, however, no affinity for basic dyestuffs.

Example 3

A copolymer of 85 parts of acrylonitrile and 15 parts of vinyl-bis-(beta-chlorethyl)-phosphonate is spun in the form of a 22% solution. The resulting thread is stretched at 135° C. in a ratio of 1:5 and then treated for 90 minutes at 98° C. with a 10% aqueous solution of pyridine, then washed, acidified at 80° C. with a 3% solution of hydrofluoboric acid and washed until neutral. The fiber so treated can be dyed with basic and acid dyestuffs. Acid dyestuffs, for example Alizarin Sky Blue FFB (5% calculated upon the fiber, absorption about 8%), Azo Pure Black 3 BL (10% calculated upon the fiber) and Anthralen Red G (3% calculated upon the fiber) yield intense, brilliant tints (dyeing was performed as described in Example 1). Basic dyestuffs, such as Rhodamin B (2% calculated upon the fiber) yield less strong tints (heated to 95° C. within 20 minutes and dyed at that temperature within 90 minutes); a pastel-colored tint is produced. The dyeings have a good fastness to boiling alkaline washing baths.

Example 4

A copolymer is treated as described in Example 3 with the exception, however, that instead of pyridine a solution of morpholine of the same concentration is used. The resulting fiber dyed with acid dyestuffs yields about the same deep tints but possesses a considerably better affinity for basic dyestuffs. Rhodamin B or Astracyanine B yield deep brilliant red or blue shades which are very fast to mild washing.

Example 5

A thread spun as described in Example 3 is treated for 60 minutes at 98° C. with a 4% aqueous solution of ethylene iminopropionitrile, thoroughly washed with warm water, then acidified for 15 minutes at 80° C. with a 2% solution of hydrofluoboric acid, and washed until neutral. The resulting fiber can be dyed deep tints with acid dyestuffs, such as Alizarin Sky Blue FFB or Azo-acid Black 3 BL, which are fast to washing with boiling alkalies. The fibers can also be dyed with metal complex dyestuffs. Vialon Fast Brown R (3% calculated upon the fiber, dyed for 90 minutes at 96° C. with addition of 2 g./l. of ammonium sulfate and again dyed for 30 minutes at that temperature) yielded satisfactory tints of a very good fastness. Basic dyestuffs yield bright pastel-colored tints of good fastness.

Example 6

20 parts of a copolymer of 85 parts of acrylonitrile and 15 parts of vinyl-bis-(beta-chlorethyl)-phosphonate are dissolved in 80 parts of dimethyl formamide and 4.4 parts of butyl-ethylene-thiourea are added. The solution is then heated while stirring slowly and with exclusion of air to 100° C. and allowed to stand at that temperature for 2 hours. The clear and weakly colored solution is made into a film which is cut into small strips and then stretched by about 4 times its length. It can be well dyed with acid dyestuffs; basic dyestuffs yield only poor shades.

Example 7

10 grams of a copolymer of 85 parts of acrylonitrile and 15 parts of vinyl-bis-(beta-chlorethyl)-phosphonate are boiled under reflux for 45 minutes with n/5 hydrochloric acid, washed and dried. The resulting product is dissolved in 40 cc. of dimethyl formamide and then made into a film which is dried and then stretched by about three times its length. The film so produced can be dyed brilliant tints with basic dyestuffs, such as Rhodamin B or Astrazon Yellow 3 g. (in each case 2% calculated upon the fiber). Dispersion dyestuffs such as Perliton Blue B or Perliton Scarlet R (in each case 4% calculated upon the fiber) dyed for 90 minutes at 98° C. likewise produce good shades. All dyeings have a good fastness to washing and boiling.

We claim:
1. Copolymers of acrylonitrile with haloalkyl esters of vinylphosphonic acid, said esters having haloalkyl groups containing 1–4 carbon atoms each, the dyestuff-affinity of which copolymers is improved by contacting with an amine at a temperature up to 120° C., whereby a part of the halogen atoms in said haloalkyl groups is replaced by amino groups, said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

2. The process for improving the dyestuff-affinity of macromolecular copolymers of acrylonitrile with haloalkyl esters of vinylphosphonic acid, said esters having haloalkyl groups containing 1–4 carbon atoms each, which process comprises contacting said copolymers with an amine at a temperature up to 120° C., whereby a part of the halogen atoms in said haloalkyl groups is replaced by amino groups, and hydrolyzing said copolymers, said amine being selected from the group consisting of primary, secondary, and tertiary alkyl amines, primary alkylene diamines, alkanolamines, thiourea, alkyl substituted thioureas, morpholine, pyridine, piperidine pyrrolidine, piperazine, ethyleneimino-propionitrile, benzamidazothiol, and 2-mercapto benzothiazol.

3. The process for improving the dyestuff-affinity of macromolecular copolymers of acrylonitrile with haloalkyl esters of vinylphosphonic acid, said esters having haloalkyl groups containing 1–4 carbon atoms each, which process comprises contacting said copolymers with an amine at a temperature up to 120° C., said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

4. The process for improving the dyestuff-affinity of macromolecular polymers of acrylonitrile with a haloalkyl esters of vinylphosphonic acid corresponding to the general formula

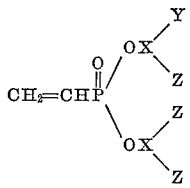

wherein X is a saturated aliphatic carbon radical containing 1–4 carbon atoms, Y is a halogen atom, and Z is a member selected from the group consisting of a halogen atom and a hydrogen atom, which process comprises contacting said copolymers with an amine at a temperature up to 120° C., whereby a part of the halogen atoms in said haloalkyl groups is replaced by amino groups, and hydrolyzing said copolymers, said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

5. The process for improving the dyestuff-affinity of macromolecular polymers of acrylonitrile with haloalkyl esters of vinylphosphonic acid corresponding to the general formula

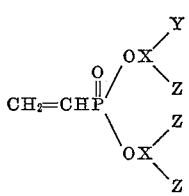

wherein X is a saturated aliphatic carbon radical containing 1–4 carbon atoms, Y is a halogen atom, and Z is a member selected from the group consisting of a halogen atom and a hydrogen atom, which process comprises contacting said copolymers with an amine at a temperature up to 120° C., said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

6. The process for improving the dyestuff-affinity of terpolymers of (1) acrylonitrile, (2) haloalkyl esters of vinylphosphonic acid, said esters having haloalkyl groups containing 1–3 carbon atoms each, and (3) a further polymerizable compound selected from the group consisting of basic and acidic monomers, which process comprises contacting said terpolymers with an amine at a temperature up to 120° C., said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

7. Copolymers of acrylonitrile with haloalkyl esters of vinylphosphonic acid, said esters having haloalkyl groups containing 1–4 carbon atoms each, the dyestuff-affinity of which copolymers is improved by contacting with an amine at a temperature up to 120° C., whereby a part of the halogen atoms in said haloalkyl groups is replaced by amino groups, and by hydrolyzing said copolymers, said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

8. Copolymers of acrylonitrile with di-(chloroethyl)-vinylphosphonic acid, the dyestuff-affinity of which copolymers is improved by contacting with an amine at a temperature up to 120° C., whereby a part of the halogen atoms in said haloalkyl groups is replaced by amino groups, and by hydrolyzing said copolymers, said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

9. The process for improving the dyestuff-affinity of macromolecular polymers of acrylonitrile and di-(chloroethyl)-vinylphosphonic acid which comprises contacting said copolymers with an amine at a temperature up to 120° C., said amine being selected from the group consisting of primary, secondary, and tertiary alkyl amines, primary alkylene diamines, alkanolamines, thiourea, alkyl substituted thioureas, morpholine, pyridine, piperidine, pyrrolidine, piperazine, ethyleneimino-propionitrile, benzamidazothiol, and 2-mercapto benzothiazol.

10. Copolymers of acrylonitrile and di-(chloroethyl)-vinylphosphonic acid, the dyestuff-affinity of which copolymers is improved by contacting with an amine at a temperature up to 120° C., whereby a part of the halogen atoms in said haloalkyl groups is replaced by amino groups, said amine being selected from the group consisting of primary, secondary, and tertiary alkyl amines, primary alkylene diamines, alkanolamines of the formula $(R)_xN(R'OH)_y$ where R is a member selected from the group consisting of hydrogen and lower alkyl radicals, R' is a lower alkylene radical, $x$ is an integer from 0 to 2, $y$ is an integer from 1 to 3, and $x+y=3$, thiourea, alkyl substituted thioureas, morpholine, pyridine, piperidine, pyrrolidine, piperazine, ethylene-imino-propionitrile, benzamidazothiol, and 2-mercapto benzothiazol.

11. The process of claim 1, wherein said amine is pyrrolidine.

12. The process of claim 1, wherein said amine is ethylene thio-urea.

13. The process of claim 1, wherein said amine is pyridine.

14. The process of claim 1, wherein said amine is morpholine.

15. The process of claim 1, wherein said amine is ethylene-imino-propionitrile.

References Cited in the file of this patent

UNITED STATES PATENTS

| | | |
|---|---|---|
| 2,548,853 | Baker | Apr. 17, 1951 |
| 2,557,805 | Upson | June 19, 1951 |
| 2,636,027 | Coover et al. | Apr. 21, 1953 |
| 2,656,336 | Ham | Oct. 20, 1953 |
| 2,721,876 | Dickey et al. | Oct. 25, 1955 |
| 2,758,003 | Kleiner et al. | Aug. 7, 1956 |
| 2,827,475 | Coover | Mar. 18, 1958 |
| 2,888,434 | Shashoua | May 26, 1959 |